(12) United States Patent
Lawlor et al.

(10) Patent No.: US 7,242,320 B2
(45) Date of Patent: Jul. 10, 2007

(54) MODULAR REARVIEW MIRROR ASSEMBLY

(75) Inventors: Patrick Lawlor, Dublin (IE); Garret Coady, Dublin (IE)

(73) Assignee: Donnelly Mirrors Limited, Naas, County Kildare (IE)

( * ) Notice: Subject to any disclaimer, the term of this patent is extended or adjusted under 35 U.S.C. 154(b) by 288 days.

(21) Appl. No.: 10/514,709

(22) PCT Filed: May 22, 2003

(86) PCT No.: PCT/IE03/00081

§ 371 (c)(1),
(2), (4) Date: Nov. 17, 2004

(87) PCT Pub. No.: WO03/099614

PCT Pub. Date: Dec. 4, 2003

(65) Prior Publication Data

US 2005/0152052 A1 Jul. 14, 2005

(30) Foreign Application Priority Data

May 24, 2002 (IE) .............................. S2002/0427

(51) Int. Cl.
*G08B 5/00* (2006.01)
*G08B 5/36* (2006.01)
*G08G 1/00* (2006.01)
*G02B 5/08* (2006.01)
*G06K 5/00* (2006.01)
*G07B 15/00* (2006.01)
*G07B 15/02* (2006.01)

(52) U.S. Cl. .............. 340/901; 340/815.4; 340/815.49; 340/815.5; 359/838; 359/871; 359/872; 235/379; 235/380; 235/384; 705/13

(58) Field of Classification Search ............. 340/815.4, 340/815.49, 815.5, 901, 815; 359/838, 871–872; 235/379–380, 384; 705/13
See application file for complete search history.

(56) References Cited

U.S. PATENT DOCUMENTS 5,582,383 A * 12/1996 Mertens et al. ............. 248/484

(Continued)

FOREIGN PATENT DOCUMENTS

GB 2380305 A 4/2003

(Continued)

OTHER PUBLICATIONS

International Search Report in PCT Appln. No. PCT/IE03/00081, International filing date May 22, 2003. * cited by examiner

*Primary Examiner*—Daniel Wu
*Assistant Examiner*—Lam Pham
(74) *Attorney, Agent, or Firm*—Van Dyke, Gardner, Linn & Burkhart, LLP (57) ABSTRACT

A vehicle rearview mirror comprises a carrier plate, an electronic component unit mounted on one face of the carrier plate, and a mirror mounted on the other face of the carrier plate. A protective housing is supported by the carrier plate, the housing exposing the mirror through a viewing aperture and enclosing the electronic component unit and carrier plate. A support bracket assembly extends from the carrier plate through the housing to mount the mirror assembly to an interior surface of a vehicle. The electronic component unit preferably includes a card reader having a card slot exposed by the housing. In another embodiment, an RF antenna is connected to circuitry included in the electronic component, the antenna preferably being mounted in the support bracket assembly. In yet another embodiment, a visual display is provided for displaying information provided by the electronic component unit.

28 Claims, 12 Drawing Sheets

U.S. PATENT DOCUMENTS

| | | | |
|---|---|---|---|
| 5,878,353 A * | 3/1999 | ul Azam et al. | 455/566 |
| 6,124,886 A * | 9/2000 | DeLine et al. | 348/148 |
| 6,158,655 A | 12/2000 | DeVries, Jr. et al. | 235/380 |
| 6,172,613 B1 * | 1/2001 | DeLine et al. | 340/815.4 |
| 6,243,003 B1 | 6/2001 | DeLine et al. | 340/425.5 |
| 6,545,598 B1 * | 4/2003 | de Villeroche | 340/438 |
| 6,648,477 B2 * | 11/2003 | Hutzel et al. | 359/604 |
| 6,690,268 B2 * | 2/2004 | Schofield et al. | 340/438 |
| 6,742,905 B2 * | 6/2004 | Suyama et al. | 359/838 |
| 6,889,064 B2 * | 5/2005 | Baratono et al. | 455/569.2 |
| 7,075,511 B1 * | 7/2006 | Mousseau et al. | 345/156 |
| 2002/0032510 A1 * | 3/2002 | Turnbull et al. | 701/49 |

FOREIGN PATENT DOCUMENTS

| | | |
|---|---|---|
| GB | 2380306 A | 4/2003 |
| JP | 08297758 | 11/1996 |
| JP | 11011216 | 1/1999 |
| JP | 11028980 | 2/1999 |
| JP | 2002337613 | 11/2002 |

* cited by examiner

MODULAR REARVIEW MIRROR ASSEMBLY

This invention relates to rearview mirror assemblies, such as are used in vehicles.

The conventional design of rearview mirror includes a bracket and a mirror mounted in the housing and protected at its periphery by a bezel mounted to the housing.

In recent years, manufacturers have added a range of extra features to mirrors, many of which include electronic components and which impose additional considerations on the design of the mirror.

For example, electrochromic mirrors are known which change the reflectivity of the mirror in response to differences between ambient light and incident light on the mirror. In this way, the mirror can be caused to reduce glare when very bright incident light from a following vehicle's headlights is detected at night-time (when ambient light levels are low). Such mirrors require sensors and control circuitry which must be fitted into the housing and supported by the housing.

Many other added features have been proposed for incorporation in the rearview mirror, and indeed it is commonly proposed to use the mirror for retrofitting optional extras to a vehicle or to incorporate new features in production models of vehicles since the mirror is a stand-alone item which can be easily substituted without impacting on other aspects of the vehicle production. One example of such a proposal has been to add electronic toll collection (ETC) modules to a rearview mirror.

ETC is an automatic toll collection system for toll roads. It was developed with the objective of easing traffic congestion at toll booths, providing improved convenience through cashless transactions and reducing administration costs. Through the wireless transmission of the information necessary for toll calculation between the vehicle unit and the toll booth antenna, the toll charges can be automatically withdrawn from a user's card (which can be a prepaid toll card or a bank or credit card).

The ETC equipment which resides in the vehicles is generally available as an after market option. It incorporates a card reader and transmitting antenna as well as supporting electronics. These after-market products are generally installed in the cabin in an appropriate location i.e. on dashboard, adjacent to the centre console etc. Incorporating the ETC module in the mirror has been previously proposed but has not been commercially achieved due to the difficulty of providing an assembly which is sufficiently ergonomic, lightweight, and not overly bulky.

Adding extra components to a rearview mirror increases the weight of the mirror not only due to the weight of the components themselves, but also due to the added weight and bulk of the housing. For each additional component to be supported by the housing, the thickness of the housing (which is generally a moulded shell) must be increased, leading to added housing weight also.

With increased weight, the vibration frequency of the mirror assembly tends to be lowered, and this can lead to vibration-induced damage to components of the mirror, in particular to electronic components whose connections can be broken or loosened by vibrations.

A more fundamental problem with vibrations in mirrors is that the image clarity suffers and the user may be unable to clearly see using the mirror, which poses a very significant safety problem.

A further difficulty in providing additional mirror components is that each car manufacturer will have individual styling and dimensional requirements. Since the housing, bezel and mirror surface are the primary visible components of a standard mirror, redesign of the housing for aesthetic reasons can impact on the entire internal arrangement of components, causing a redesign of the whole mirror assembly.

The invention has as an aim the provision of an improved rearview mirror assembly particularly adapted for use with electronic toll collection systems, although not limited thereto, and in particular an assembly which can include additional internal ETC components with minimal redesign and whose external appearance can be more easily altered.

Accordingly, the invention provides a vehicle rearview mirror assembly comprising a carrier plate, an electronic component unit mounted on one face of the carrier plate, a mirror mounted on the other face of the carrier plate, a protective housing supported by the carrier plate, the housing exposing the mirror through a viewing aperture and enclosing the electronic component unit and carrier plate, and a support bracket assembly extending from the carrier plate through the housing, wherein the support bracket assembly is adapted to mount the mirror assembly to an interior surface of a vehicle and support the weight of the assembly via the carrier plate, and wherein the electronic component unit includes a card reader having a card slot exposed by the housing.

The rearview mirror assembly of the invention provides a significant advantage over known rearview mirror assemblies, in that the carrier plate provides a load-bearing chassis directly connected to the support bracket and on which the other components including the card reader can be assembled, which avoids the necessity of mounting the mirror components to the housing. When the housing is used as the chassis, the thickness and weight of the housing in its entirety must be increased, which worsens vibration problems and ultimately imposes a limit on how much equipment can be incorporated in a commercially acceptable mirror.

Using the present invention the housing, conventionally comprising a bezel surrounding the periphery of the mirror and a case fitted to the rear of the bezel, can be a lightweight skin and need not provide any significant support strength. Furthermore, since the housing is not a structural support member onto which other components are mounted, it can be easily changed for different designs to meet aesthetic or ergonomic requirements of different manufacturers.

In a preferred embodiment the housing has an external surface with a window therein, the carrier plate has an externally visible surface portion partially occluding the window and providing a card introduction surface, and the card slot is immediately adjacent the card introduction surface, whereby the leading edge of a card slidably moved along the card introduction surface of the carrier plate is guided to the card slot.

As will be described further below, this construction of rearview mirror assembly allows an ergonomic interface for introducing a card to the slot, while simplifying the provision of a single piece housing design, due to the use of the card introduction surface provided on the carrier plate. The shape of the housing itself can be simplified to enable efficient and low-cost moulding techniques to be employed in its construction, with the more complex shape of the card introduction surface being incorporated in the carrier plate. When the carrier plate and housing are assembled together, they together provide an exterior surface which facilitates the introduction of a card to the slot without requiring the driver of a vehicle to be distracted from driving.

There is also provided, as a separate and independent invention, a vehicle rearview mirror assembly comprising a mirror, an electronic component unit, a protective housing exposing the mirror through a viewing aperture and enclosing the electronic component unit, an RF antenna connected to the electronic component unit, and a support bracket assembly adapted to mount the mirror assembly to an interior surface of a vehicle, wherein the RF antenna is mounted in the support bracket assembly.

There is also provided, as a still further separate and independent invention, a vehicle rearview mirror assembly comprising a mirror, an electronic component unit, a protective housing exposing the mirror through a viewing aperture and enclosing the electronic component unit, an RF antenna connected to the electronic component unit, and a support bracket assembly adapted to mount the mirror assembly to an interior surface of a vehicle, the mirror assembly further including a visual display for displaying information provided by said electronic component unit.

An embodiment of the invention will now be described, by way of example, with reference to the accompanying drawings, in which.

Figure 1:
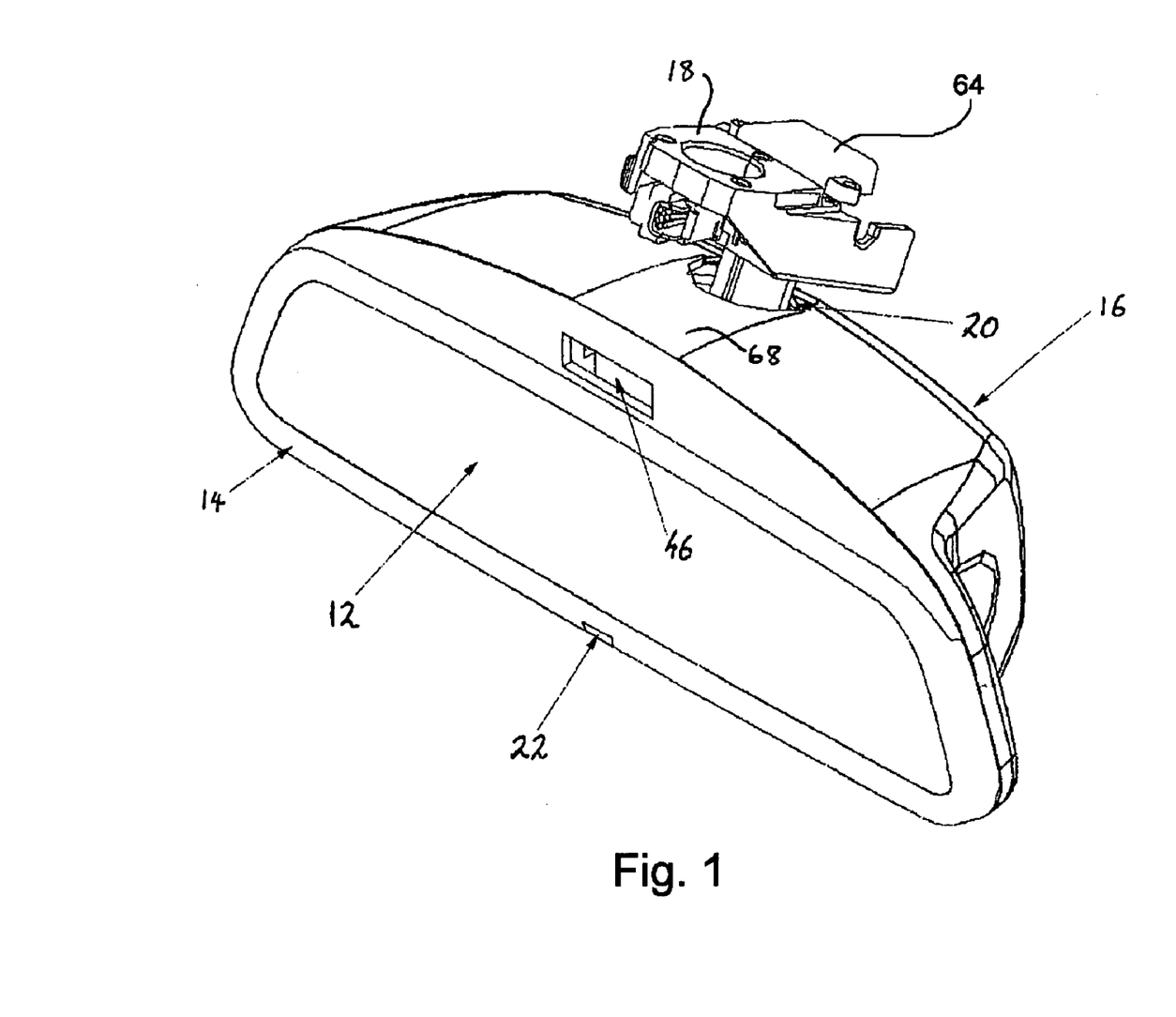
FIG. 1 is a front perspective view of a vehicle interior rearview mirror assembly according to the invention.

Referring to FIG. 1, there is shown a rearview mirror assembly 10 having an electrochromic mirror 12 of known construction behind a bezel 14 defining a viewing aperture, with the bezel 14 having a lightweight case 16 connected thereto. A ball and socket-type support bracket assembly 18 protrudes from the case through an opening 20 for affixing the mirror assembly 10 to a windscreen. A glare sensor 22 at the front of the mirror detects the intensity of incident light on the mirror, and a corresponding ambient light sensor is located in a recess 24 (see FIG. 2) on the windscreen-facing portion of the case 16.

Figure 2:
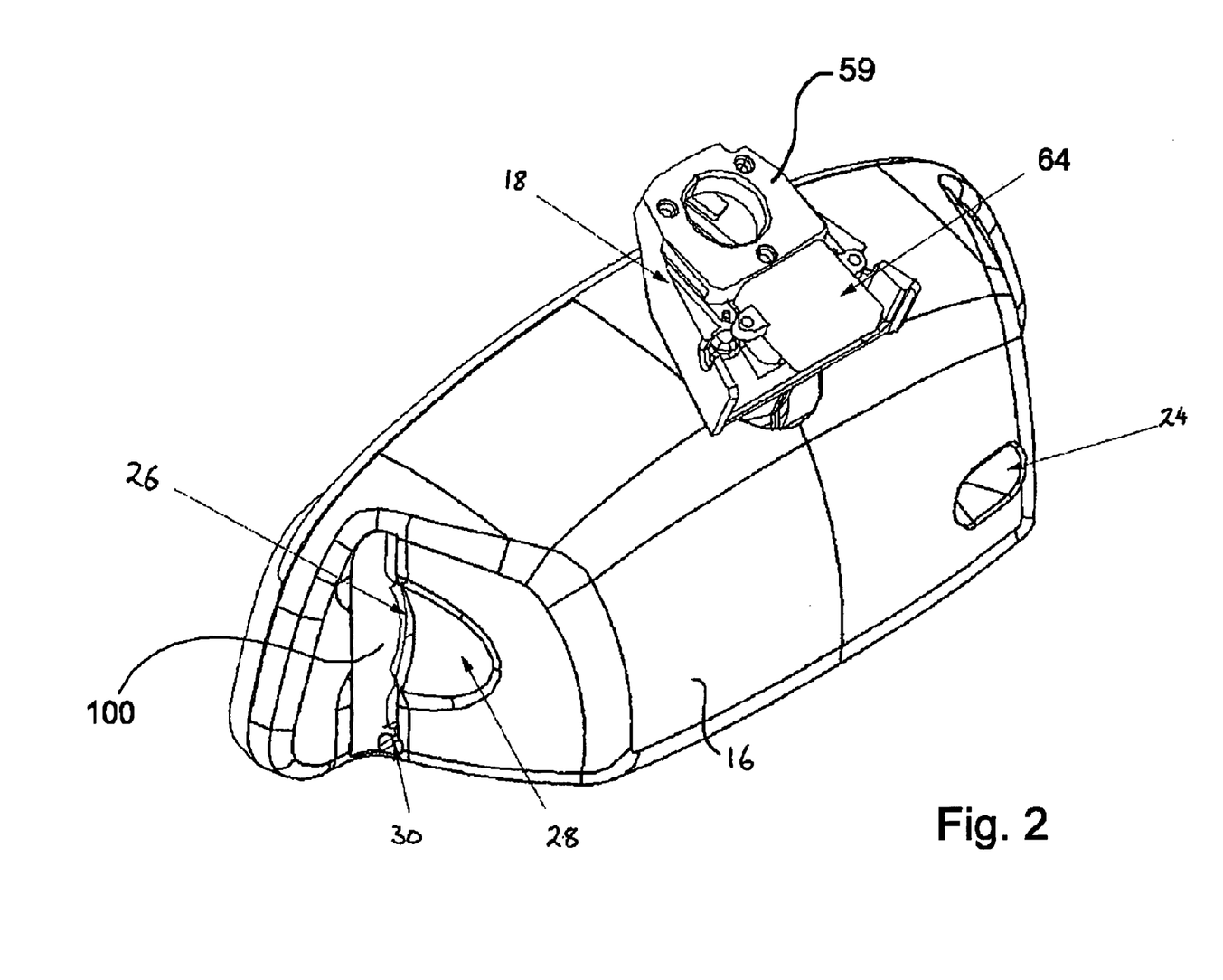
FIG. 2 is a rear perspective view of the mirror assembly of FIG. 1.
Figure 8:
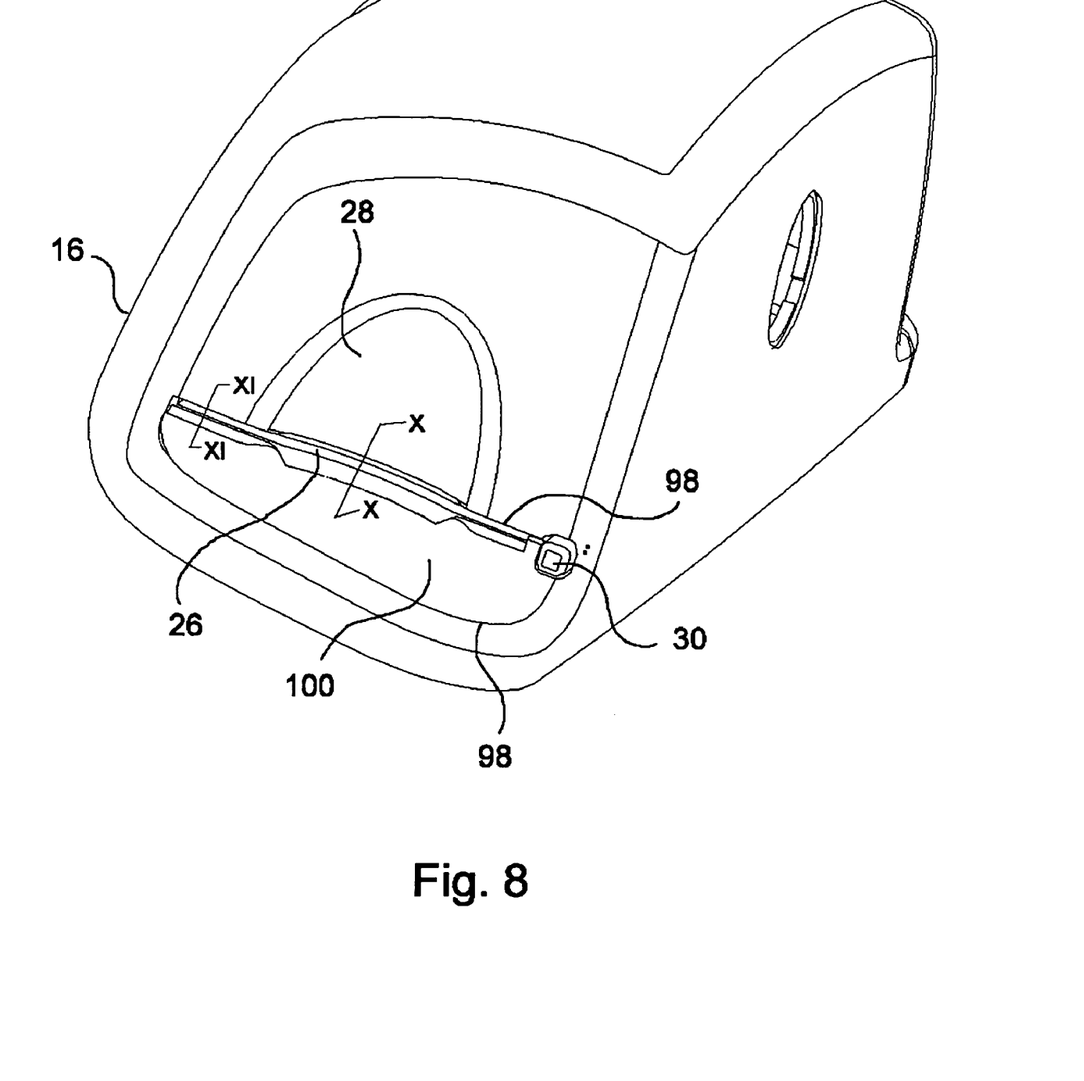
FIG. 8 shows a detail of the mirror case including the card slot of a card reader.

Also shown in FIG. 2 is a card slot 26 for receiving a card such as a credit card or prepaid toll card. The card slot is the mouth of a card reader 48, FIG. 3, of conventional type which receives the card and electronically or magnetically reads information encoded thereon. The case 16 has a concave recess 28 adjacent the slot 26, and the slot 26 has a corresponding scalloped shape. The recess 28 is interrupted by the slot 26 but continues into surface 100 as shown in FIG. 8 and described more fully below. This arrangement of the recess in both surfaces either side of the slot and the scalloped slot itself, allows a user's thumb to push the card home into the card reader. The card is ejected from the reader using an eject button 30 which extends when a card is present and which when depressed actuates an eject mechanism.

Figure 3:
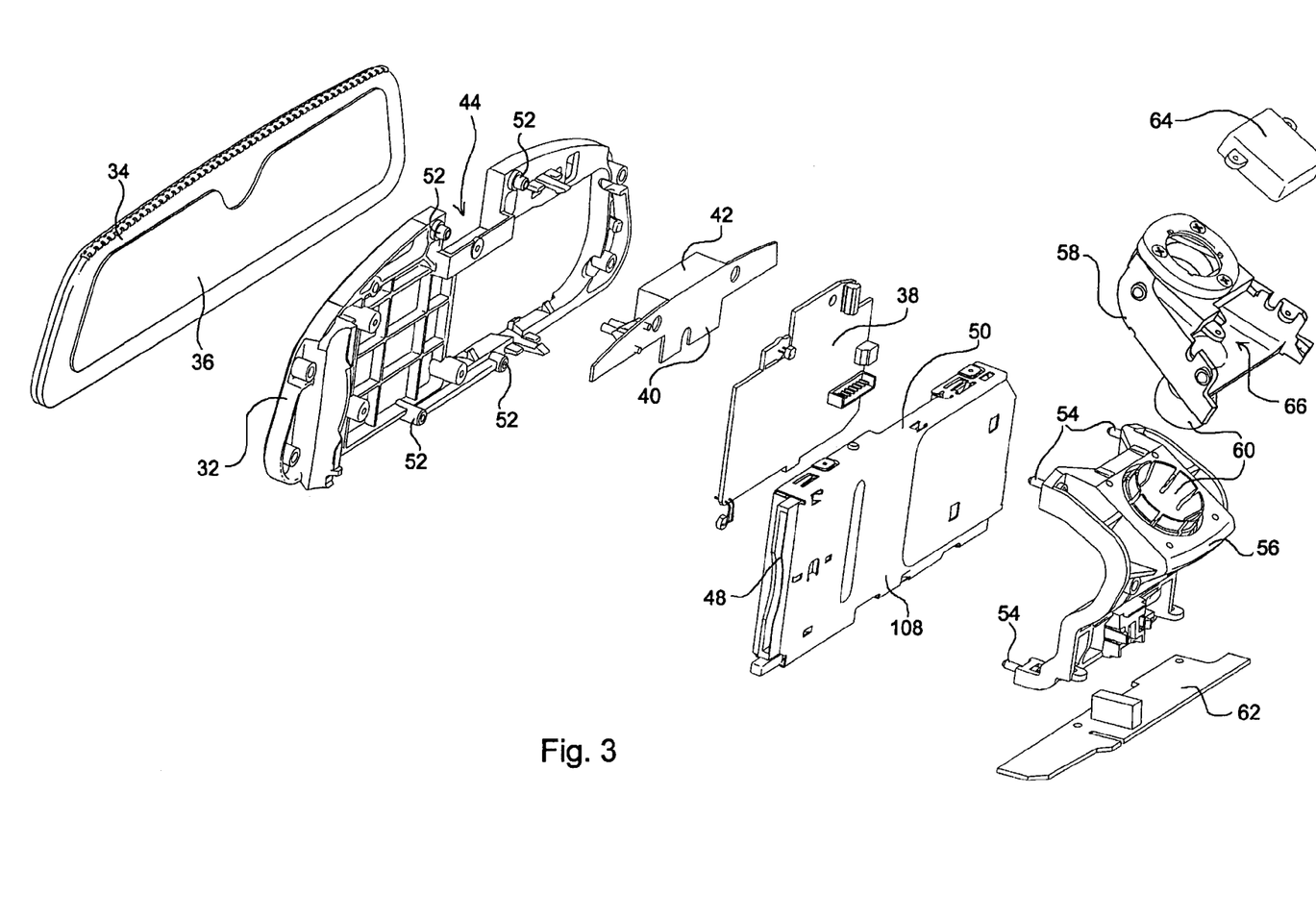
FIG. 3 is an exploded view of the internal components of the mirror assembly of FIG. 1.

FIG. 3 shows the internal components of the assembly in exploded view. The core structural component of the assembly is a carrier plate 32 on one face of which there is mounted an electrochromic mirror unit 34 by means of an adhesive tape 36. The electrochromic mirror unit is of a type well known in the art which can reduce the amount of reflected light under the control of a control unit mounted on a printed circuit board (PCB) 38. PCB 38 is mounted on the carrier plate also. Though shown in a position to be mounted on the opposite face to the electrochromic mirror unit, it can be mounted on the same face of the carrier plate as the mirror unit.

A smaller display PCB 40 mounts on the carrier plate and has a protruding display block 42 which sits in a recess 44 on top of the carrier plate. When the mirror is assembled, the front face of this display block (not visible in FIG. 3) provides a visual display of system parameters in a window 46 provided in the front of the mirror assembly housing (see FIG. 1). Such a display might, for example, show the amount deducted from a toll card or credit card by the card reader and associated ETC circuitry mounted on an electronic component unit 50, FIG. 3, when the vehicle passes through an electronic toll booth system. Alternatively, diagnostic or system circuitry may be present on the unit 50 or elsewhere in the mirror assembly which displays status or error messages through the display block when the mirror systems are being diagnosed or maintained. The display PCB 40 is provided with display driver circuitry which can display suitable information from any system to which it is connected. Alternative or additional visual display aids and cues can be provided on the exterior of the mirror, such as LED warning or status lights.

The display can be omitted from the mirror entirely, and display functions and the human-machine interface removed to a different location in the vehicle, with appropriate signals being passed to or from the electronics and systems in the mirror assembly. For example, the interface for an ETC system may be advantageously incorporated into an onboard navigation or computer system, which will have a more sophisticated display to provide information about transaction history, credit remaining, tolls due on a particular route, and lane layouts leading to a toll booth.

Other options for housing the interface electronics are an overhead console or an accessory module on a windscreen mount, such as is described in U.S. Pat. No. 6,243,003 to DeLine et al. (assigned to Donnelly Corporation), the contents of which are incorporated herein by reference.

Apart from moving the display to other locations in the cabin (or even to remote locations, such as allowing a fleet manager to interact with the credit and toll history functions of the ETC system), any of the other individual electronic components described herein may be removed from the mirror to another cabin location or a remote location as appropriate.

The card reader 48 as described above is provided on the electronic component unit 50 which also includes an ETC module, an RF amplifier for amplifying received RF signals, and other system circuitry. The card reader 48 and other components of the electronic circuitry unit 50 are encased in a rigid metal casing 108 for electronic static discharge control and electromagnetic shielding purposes (see also FIGS. 10 and 11). To decrease weight the metal casing can be replaced by a plastic casing with a metallised casing, or if discharge protection and shielding are not considered vital, the casing can be omitted altogether.

However, by employing a rigid casing for the electronic circuitry unit 50 and sandwiching the carrier plate 32 between the electronic circuitry unit 50 and the electrochromic mirror unit 24, a strong but relatively lightweight carrier plate can be employed. These three components provide a rigid sandwich which carries a large portion of the weight of the mirror. Increasing the rigidity of this sub-assembly tends to increase the natural vibration frequency of the mirror assembly making it less susceptible to vibration-induced damage from the relatively low frequency vibrations experienced in the environment of a car or other vehicle.

The carrier plate 32 provides mounting points 52 for four corresponding mounting points 54 on a moulded plastics socket member 56 of the bracket assembly 18. The socket member 56 thus mounts directly onto the carrier plate 32, and a metal bracket 58 connects to the socket member 56 via a conventional ball and socket arrangement 60. The bracket 58 has a mounting area 59 (see especially FIG. 2) adapted to be fixed to a so-called mounting button (not shown) fixed to the vehicle header or at the top of the vehicle windscreen in known manner.

A remote keyless entry (RKE) PCB 62 is mounted below the baseplate to receive coded signals and communicate with the central locking system of the vehicle to unlock the doors.

Figure 3A:
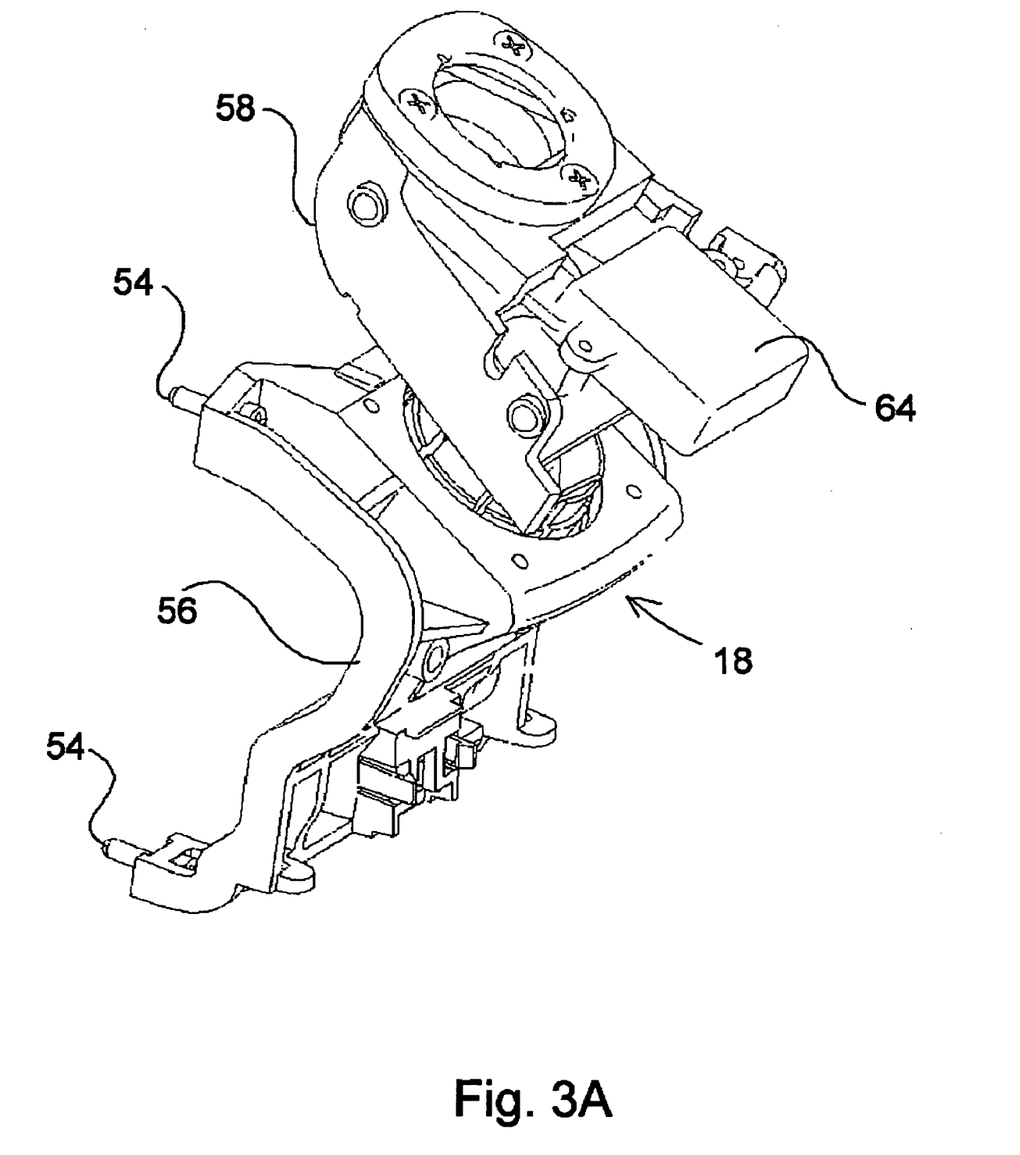
FIG. 3A is an enlarged view of the bracket and antenna.

Referring also to FIG. 3A, an ETC antenna located in a protective housing 64 is mounted in a recess 66 in the front of the bracket 58 (i.e. the side facing the windscreen in use) and provides RF signals to and from the ETC circuitry in the electronic circuitry unit 50 via a wire harness (not shown) passing through the open bore of the socket 60. Mounting the ETC unit in the mirror, and particularly using the bracket as a mounting point for the antenna provides significant advantages for reliability of the ETC technology. As compared with aftermarket solutions, the mirror-mounted ETC provides a standardised location optimally suited to communicate with overhead electronic toll booth units as the vehicle approaches the booth. In an aftermarket solution, the strength and direction of the signal from the antenna is dependent on the user's choice of location. Furthermore, RF signals are attenuated minimally when the antenna is adjacent to the windscreen glass, unlike when it is on the dashboard or elsewhere in the cabin.

A case surface plug 68 closes the case opening which receives the bracket assembly (see also FIG. 1), though this plug can be incorporated as an integral extension piece extending back from the mirror bezel. Either solution allows the bezel and case to be connected together in a simple manner around the internal components. In the embodiment shown, the bezel mounts on the carrier plate, with the case connecting to the bezel, although the opposite could be the case. The bezel and case are thus not structurally important items but rather are provided as a skin around the structural mirror assembly.

It will be appreciated that this allows a different design of case to be substituted to meet the demands of different manufacturers without redesigning either the carrier plate/mirror/electronics subassembly or the bracket sub-assembly.

Furthermore, the invention provides a modular assembly in which the carrier plate/mirror/electronics subassembly can be made in a first location, and the bracket sub-assembly, complete with wire harness, can be made in a second location. Then these sub-assemblies can be shipped to the final destination for a relatively unskilled and quick final assembly process with the connectors being plugged in, the baseplate fixed on the carrier plate, and the "cosmetic skin" of the bezel and case attached.

Figure 4:
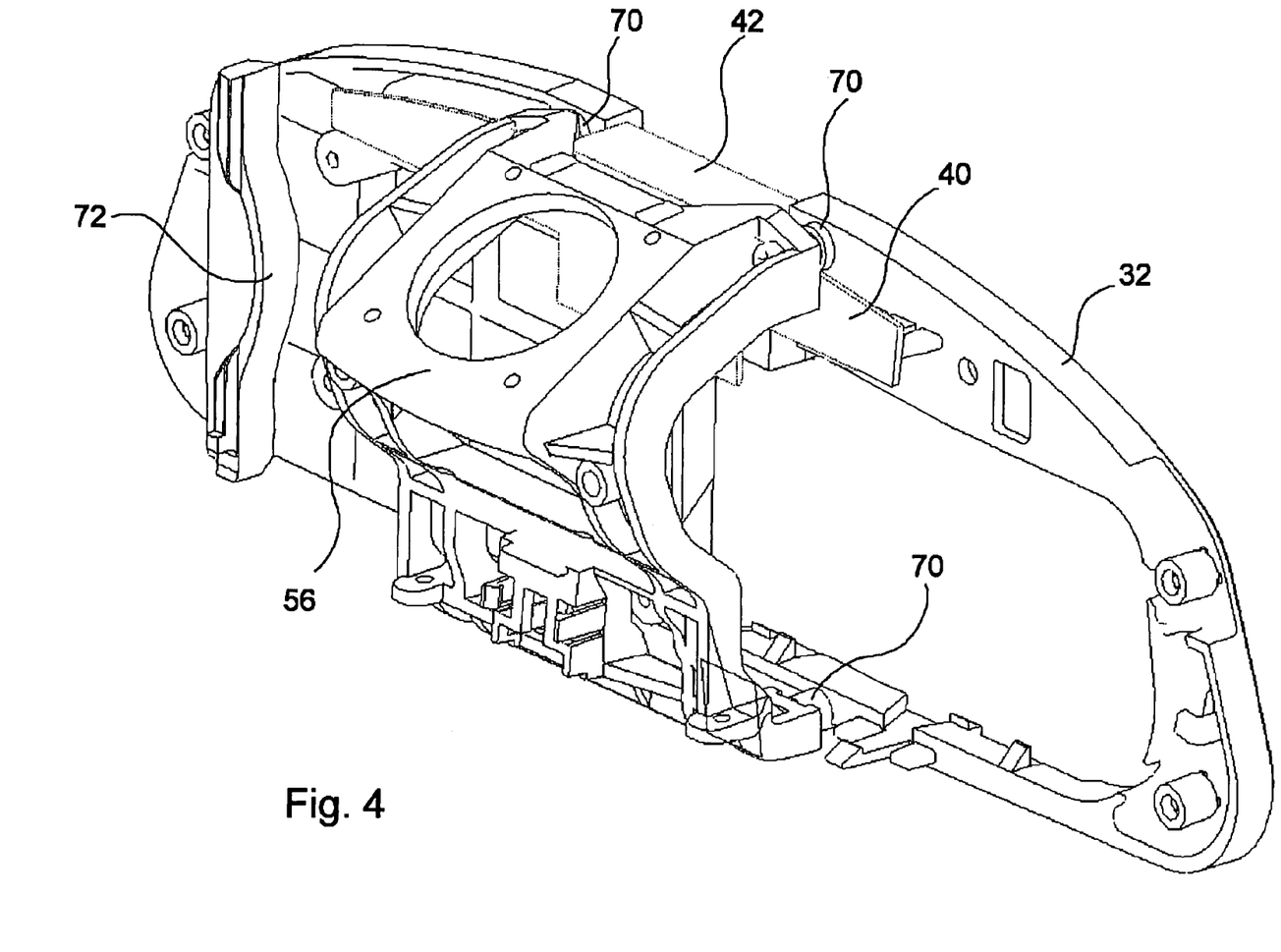
FIG. 4 shows the mounting of the bracket baseplate to the carrier plate of the assembly of FIG. 1, with the electronics circuitry unit omitted.

FIG. 4 shows the mounting of the bracket baseplate 56 to the carrier plate 32, with the electronics circuitry unit 50 omitted for clarity. It can be seen that the display PCB 40 is sandwiched between the baseplate and the carrier plate with a set of rubber grommets 70 cushioning the PCB against compressive forces imparted from the screws used to hold the components together. This is advantageous also in that no additional fixing points or components are needed for the display PCB, as it takes advantage of the mounting between the baseplate and carrier plate for its own mounting to the carrier plate.

This view also shows at one end of the carrier plate a raised card introduction feature 72 which facilitates the introduction of a card to the card reader, as will be explained more fully below.

The electronics circuitry unit 50 is held between the carrier plate 32 and the socket member 56, which provide support to the components in the electronics circuitry unit. Generally, the first board in the electronics circuitry unit may be mounted to the carrier plate, and additional boards connected to the first board in a layered configuration using board-to-board connectors. By then adding the baseplate outside the final board, the structure is supported and strains on the board-to-board connectors are relieved.

Figure 5:
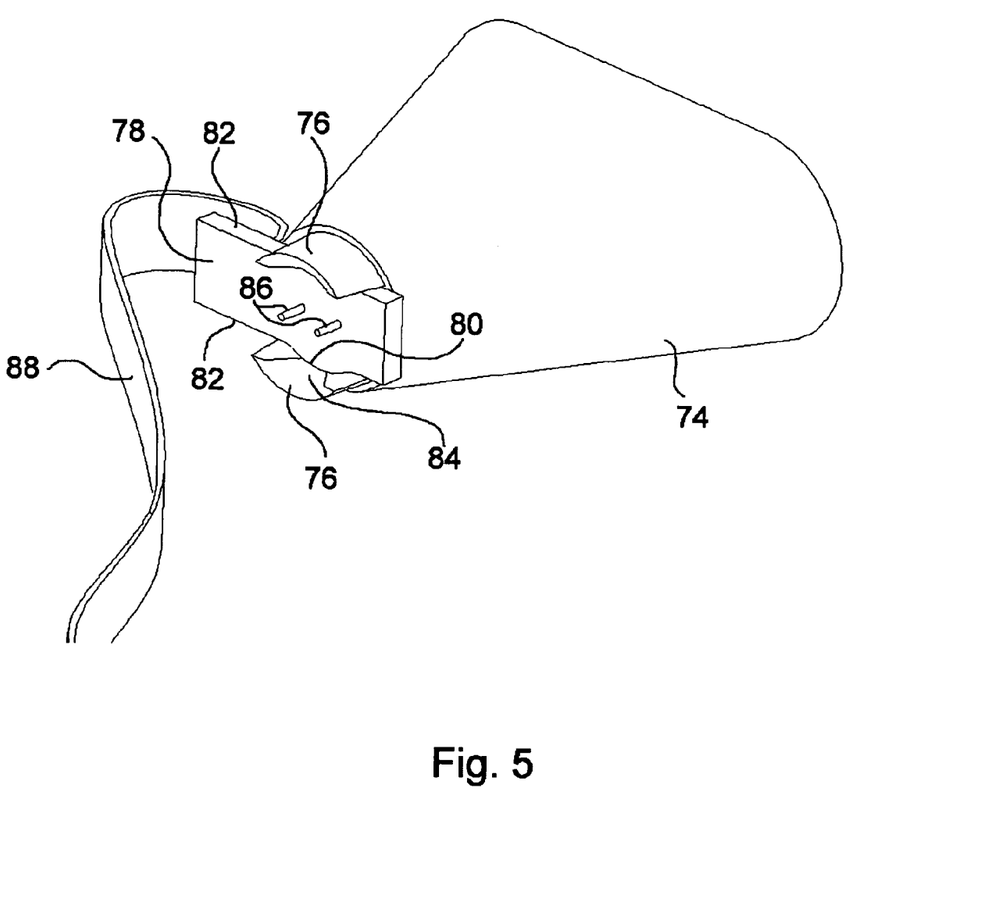
FIG. 5 shows an interior detail of the mirror case including a mount for an ambient light sensor.

As indicated previously with reference to FIG. 2, the ambient light sensor is located in a recess on the windscreen facing surface of the case. FIG. 5 shows a detail of the case interior with the recess seen in FIG. 2 shown as a conical formation 74. A pair of fingers 76 extend into the interior of the case from the conical formation 74 and a very small section of a PCB 78 is clipped into these fingers, which resiliently trap a widened bulge 80 on each lateral edge 82 of the PCB 78 behind a ridge 84. The legs 86 of the light sensitive diode employed to measure ambient light can be seen protruding from the back of the PCB 78 and a flexible lead 88 extends from the small PCB back to the electrochromic mirror control PCB 38 to pass signals indicative of the measured ambient light from the diode (this lead and the small PCB section 78 are not shown in FIG. 2 for clarity). The triangular aspect of the ridge 84 can be formed by moulding the fingers and subsequently machining away a small quantity of finger material from the interior side of the case and the exterior side of the case (through the conical formation).

Figure 6:
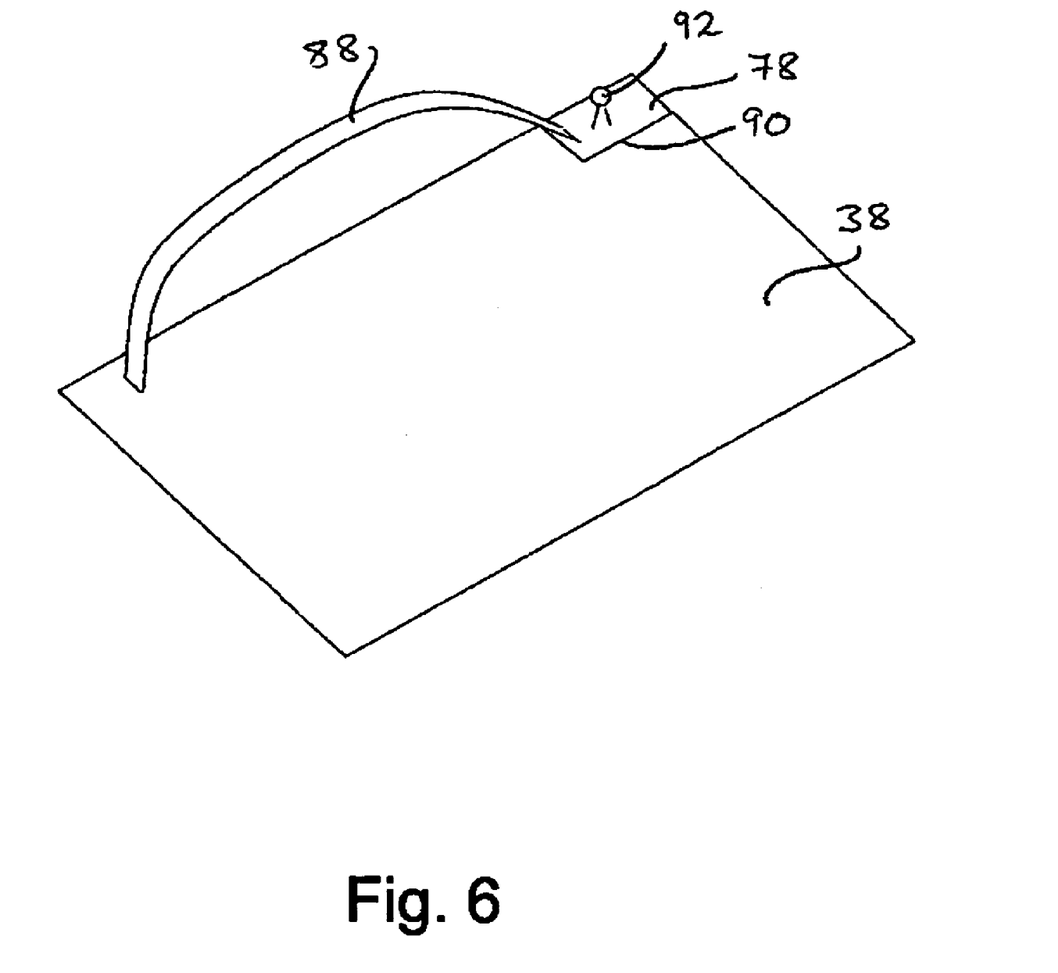
FIG. 6 shows the electrochromic mirror control board forming part of the mirror assembly.

FIG. 6 shows the electrochromic mirror control board 38 schematically after manufacture and before assembly in the mirror assembly. The board 38 includes the small section 78 after manufacture. The boundary 90 of the small PCB section 78 is weakened by a router or other means to allow small section 78 to be snapped away from the main board 38 with the flexible lead and the ambient light measuring diode 92 intact. Thus, board 38 can be supplied as a unitary piece from the electronics fabrication plant, and in the mirror assembly plant the small section is snapped off the main board and clipped into place in the housing. This construction and assembly method is particularly advantageous for relatively large mirror cases where it is impractical to use a light sensor directly mounted on the board 38 to measure light at a surface of the case due to the distance from the board to the surface of the case.

Figure 7:
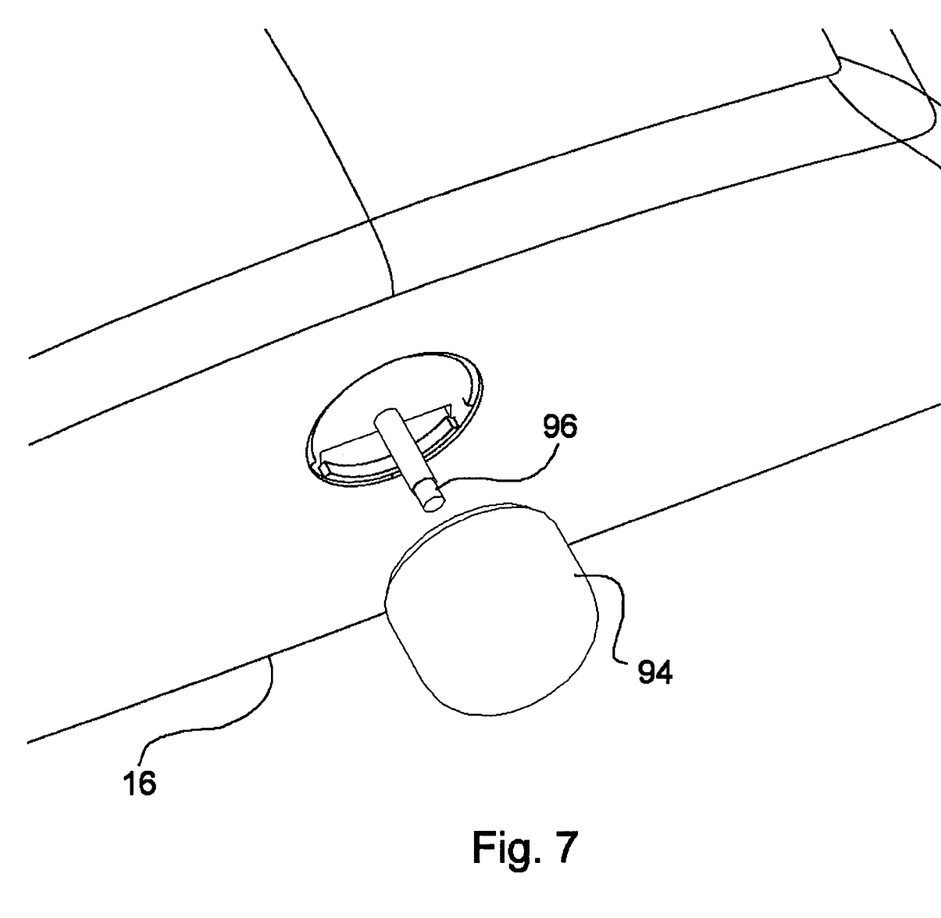
FIG. 7 shows a detail of the mirror case including an LED.

A further innovative feature is shown in FIG. 7, which shows the underside of the case 16. A translucent coloured plastics cover 94 is affixed to the case as a display device. An LED 96 mounted on the RKE PCB 62 (FIG. 3) extends into this cover, and when the alarm is activated, flashes as a warning. The cover can be removed as shown to reveal a data socket (not shown) for a jack mounted on a lead. This data socket can be connected to diagnostic systems or programmable circuits in the electronics circuitry unit 50, allowing the mirror systems to be serviced, diagnosed or upgraded by passing suitable electronic signals to the circuits and optionally monitoring the responses received back through the socket or appearing on the display 42.

As an alternative to the use of a "stereo jack" type connection for diagnostic and maintenance purposes, the translucent cap may cover an infrared transceiver, and signals may thus be passed wirelessly from the mirror circuitry to the external testing, diagnostic, maintenance or updating equipment using infrared data exchange protocols.

FIG. 8 shows a further detail of the case 16, i.e. the side of the case with the recess 28 (see also FIGS. 2 and 3) allowing a card to be inserted in the card slot 26 of the card reader 48. A window 98 in the external surface of the case 16 provides access to the card reader 48. As mentioned above, however, a card introduction feature 72 (FIG. 4) is provided on the carrier plate, and this feature has an external surface portion 100 partially occluding the window 98 to provide a card introduction surface.

The leading edge of a card slidably moved along the card introduction surface 100 of the carrier plate is guided to the card slot allowing a driver to insert a card with minimal distraction (it should be appreciated that the card introduction surface and card slot are not visible from the front (mirror side) of the mirror assembly, mainly for aesthetic reasons, and thus the driver should be able to insert the card by feel.

The lateral extremities of the card introduction surface can be bevelled to provide a discontinuity laterally between the card introduction surface and the case. This allows the user to locate the side edge of the card against the side of the slot. Instead of bevelling the card introduction surface, one could also design a step or other discontinuity between the card introduction surface and the case.

Figure 9:
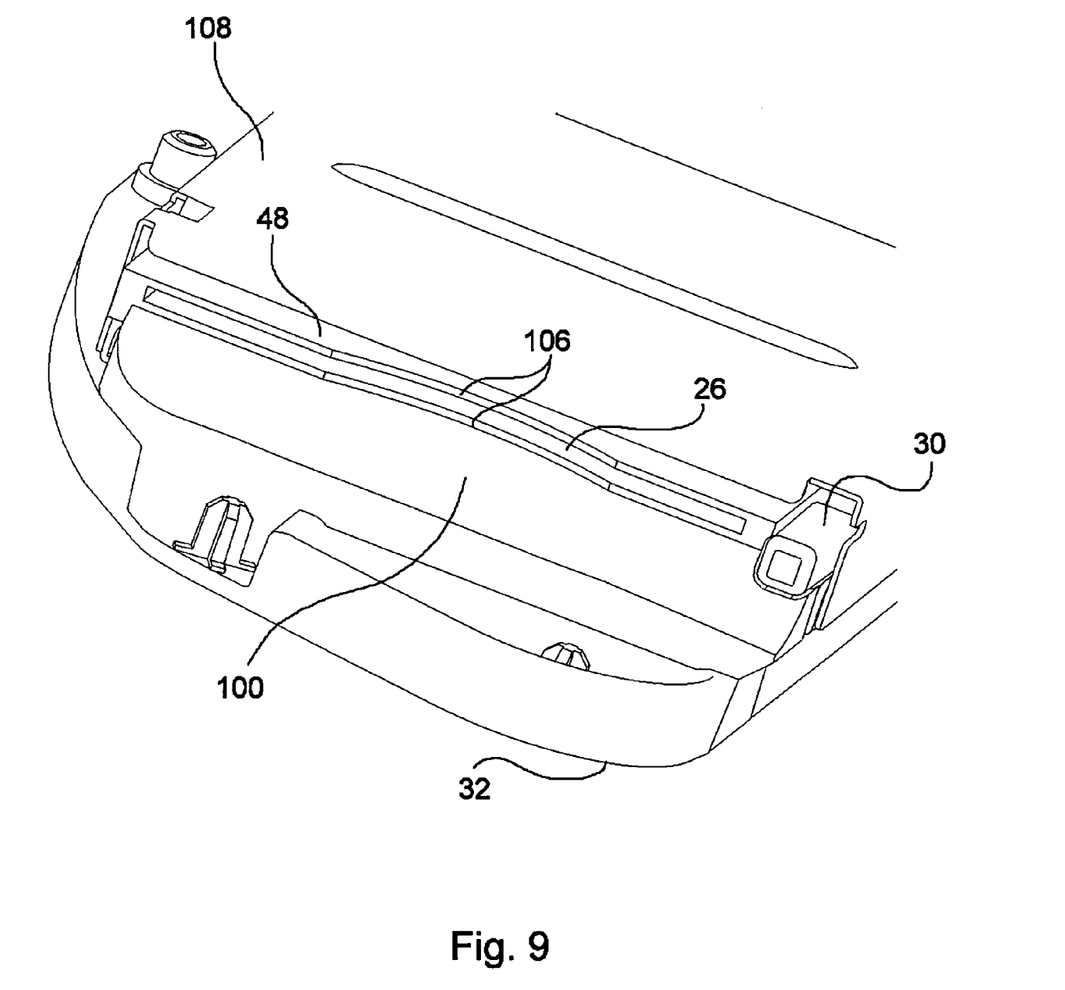
FIG. 9 shows interior of the mirror case in the region of the card slot.

FIG. 9 shows the same detail of the carrier plate 32 when the case 16 is removed. The card reader 48 is seen extending from the end of the metal casing 108 for the electronics circuitry unit, and a card 104 is pushed fully home into the card reader, with the trailing edge of the card visible beyond the scalloped cut-out at the mouth of the slot of the card reader.

The card introduction surface 100 of the carrier plate 32 is designed to be substantially continuous with the exterior surface of the case. This allows the case to be brought onto the bezel mounted on the carrier plate directly without manoeuvring the parts, which would otherwise be necessary if the card introduction surface were in the exterior surface of the case. To see why this is so, one need only consider the card ejection button which protrudes past the card introduction surface. Furthermore, if reference is made to FIG. 8, it can be seen that the gap or slot between the card introduction surface and the case which admits the card to the slot is formed in a direction parallel to the bezel-engaging rim of the case. To form this gap or slot in a single piece case using injection moulding would require a far more complex mould since the gap or slot runs transverse to the direction in which the case would be ejected from the mould.

Figure 10:
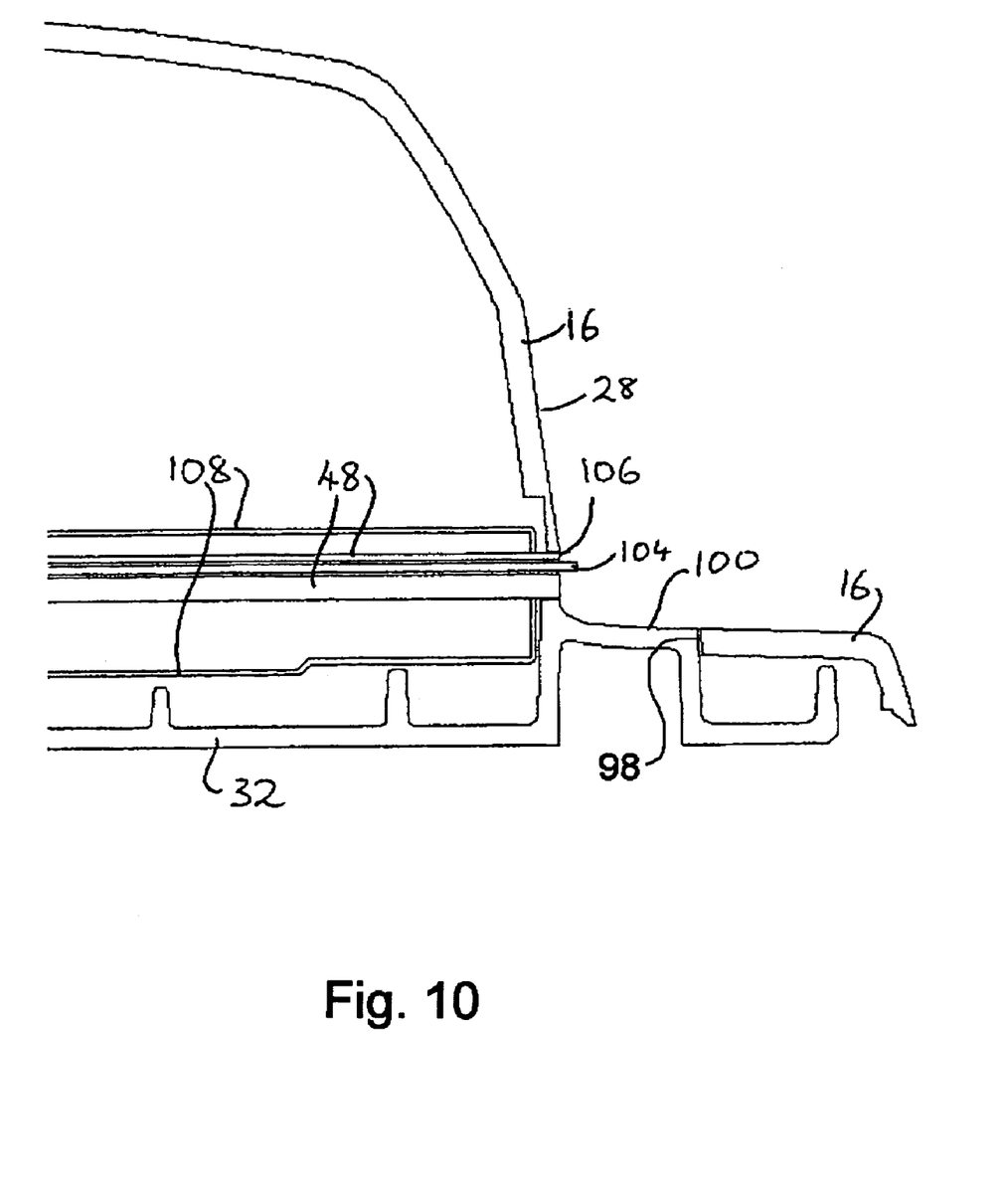
FIG. 10 shows the mirror case, card reader and card introduction surface in cross-section along the line X in FIG. 8.
Figure 11:
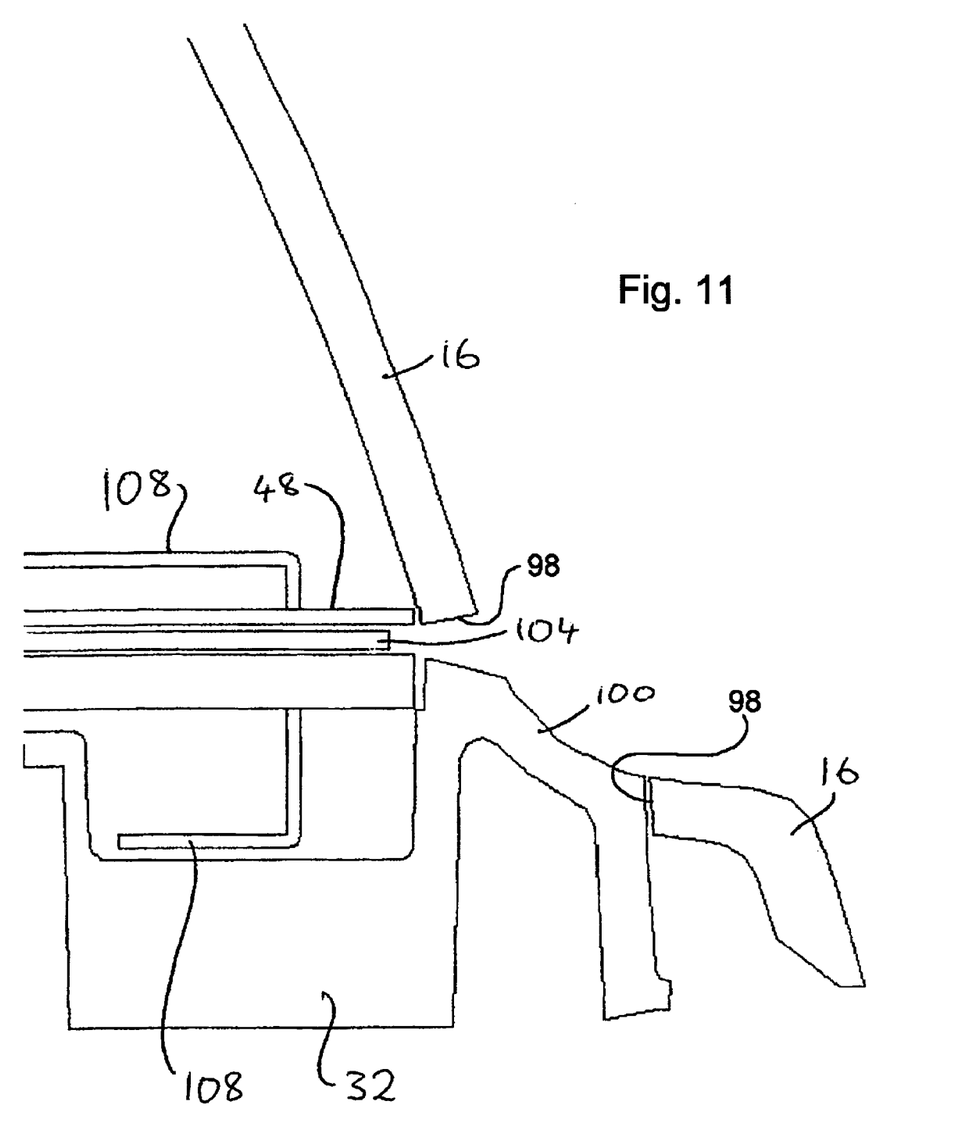
FIG. 11 shows the mirror case, card reader and card introduction surface in cross-section along the line XI in FIG. 8.

FIGS. 10 and 11 show the case 16, card reader 48 and card introduction surface 100 in cross section along the lines indicated as X and XI in FIG. 8. In FIG. 10 it can be seen that the card protrudes slightly past the scalloped cut-out 106 at the front of reader 48, so that the user can easily push the card to this position by taking advantage of the recess 28 in the case 16 and the flush mating of the card introduction surface 100 with the front of the card reader 48.

FIG. 10 also shows that the card reader's front surface is flush with the front surface of the card introduction surface at the point where the cross-section is taken. This means that the card reader overhangs the material behind the card introduction surface and is a further reason why a one-piece case would prevent the carrier plate and case being brought into engagement directly (i.e. it can be seen that the card reader would need to be manoeuvred past the card introduction surface with great difficulty if the card introduction surface were part of the case rather than being provided on the carrier plate.

In FIG. 11, in contrast, the card 104 is seen to be fully received in the reader 48, as there is no scalloped cut-out at this point on the card slot, and the reader is concealed by the case and the card introduction surface 100. Thus, a card whose leading edge is pushed along and up the card introduction surface 100 will be directed easily into the card reader.

The card reader can be omitted in assemblies according to the invention and replaced by a card swipe mechanism, with the case providing a slit to reveal the swipe path of the card through the swipe mechanism.

The invention is not limited to the embodiments described herein which may be modified or varied without departing from the scope of the invention.

The invention claimed is:

1. A vehicle rearview mirror assembly comprising a carrier plate, an electronic component unit mounted on one face of the carrier plate, a mirror mounted on the other face of the carrier plate, a protective housing supported by the carrier plate, the housing exposing the mirror through a viewing aperture and enclosing the electronic component unit and carrier plate, and a support bracket assembly extending from the carrier plate through the housing, wherein the support bracket assembly is adapted to mount the mirror assembly to an interior surface of a vehicle and support the weight of the assembly via the carrier plate, and wherein the electronic component unit includes a card reader having a card slot exposed by the housing.

2. A rearview mirror assembly according to claim 1, wherein the housing has an external surface with a window therein, the carrier plate has an externally visible surface portion partially occluding the window and providing a card introduction surface, and the card slot is immediately adjacent the card introduction surface, whereby the leading edge of a card slidably moved along the card introduction surface of the carrier plate is guided to the card slot.

3. A rearview mirror assembly according to claim 2, wherein the electronic component unit includes electronic toll collection (ETC) circuitry connected to the card reader.

4. A review mirror assembly according to claim 3, further including an RF antenna connected to the ETC circuitry.

5. A rearview mirror assembly according to claim 4, wherein the RF antenna is mounted in the support bracket assembly.

6. A rearview mirror assembly according to claim 5, further including a visual display for displaying electronic toll collection (ETC) information.

7. A rearview mirror assembly according to claim 6, wherein the visual display is driven by circuitry mounted on the carrier plate and is visible through an aperture in the front of the housing.

8. A rearview mirror assembly according to claim 7, wherein the housing comprises a bezel surrounding the periphery of the mirror to define the viewing aperture and a case connected to the bezel and enclosing the electronic component unit and carrier plate, one of the bezel and the case being mounted to the carrier plate.

9. A rearview mirror assembly according to claim 1 further including an RF antenna and a visual display for displaying information provided by the electronic component unit, wherein the electronic component unit is adapted to receive traffic information via the RF antenna and display such information on the visual display.

10. A rearview mirror assembly according to claim 1 further including an RF antenna and a visual display for displaying information provided by the electronic component unit, wherein the electronic component unit is adapted to receive electronic toll collection (ETC) information via the RF antenna and display such information on the visual display.

11. A vehicle rearview mirror assembly comprising a mirror, an electronic component unit, a protective housing exposing the mirror through a viewing aperture and enclosing the electronic component unit, an RF antenna connected to the electronic component unit, and a support bracket assembly adapted to mount the mirror assembly to an interior surface of a vehicle, wherein the RF antenna is mounted in the support bracket assembly, and wherein the electronic component unit is mounted on one face of a carrier plate and the mirror is mounted on the other face of the carrier plate, the protective housing being supported by the carrier plate and the support bracket assembly extending through the housing from the carrier plate, whereby the support bracket assembly is adapted to support the weight of the assembly via the carrier plate.

12. A rearview mirror assembly according to claim 11, wherein the housing comprises a bezel surrounding the periphery of the mirror to define the viewing aperture and a case connected to the bezel and enclosing the electronic component unit and carrier plate, one of the bezel and the case being mounted to the carrier plate.

13. A rearview mirror assembly according to claim 12, further including a visual display for displaying information provided by said electronic component unit.

14. A rearview mirror assembly according to claim 13, wherein the visual display is visible through an aperture in the front of the housing.

15. A rearview mirror assembly according to claim 14, wherein the electronic component unit is adapted to receive traffic information via the RF antenna and display such information on the visual display.

16. A rearview mirror assembly according to claim 15, wherein the electronic component unit is adapted to receive electronic toll collection (ETC) information via the RF antenna and display such information on the visual display.

17. A rearview mirror assembly according to claim 11, further including a visual display for displaying information provided by said electronic component unit.

18. A rearview mirror assembly according to claim 17, wherein the electronic component unit is adapted to receive traffic information via the RF antenna and display such information on the visual display.

19. A rearview mirror assembly according to claim 13, wherein the electronic component unit is adapted to receive electronic toll collection (ETC) information via the RF antenna and display such information on the visual display.

20. A vehicle rearview mirror assembly comprising a mirror, an electronic component unit, a protective housing exposing the mirror through a viewing aperture and enclosing the electronic component unit, an RF antenna connected to the electronic component unit, and a support bracket assembly adapted to mount the mirror assembly to an interior surface of a vehicle, the mirror assembly further including a visual display for displaying information provided by said electronic component unit, wherein the visual display is visible through an aperture in the front of the housing, the electronic component unit is adapted to receive electronic toll collection (ETC) information via the RF antenna and display such information on the visual display, and the electronic component unit is mounted on one face of a carrier plate and the mirror is mounted on the other face of the carrier plate, the protective housing being supported by the carrier plate and the support bracket assembly extending through the housing from the carrier plate, whereby the support bracket assembly is adapted to support the weight of the assembly via the carrier plate.

21. A rearview mirror assembly according to claim 20, wherein the housing comprises a bezel surrounding the periphery of the mirror to define the viewing aperture and a case connected to the bezel and enclosing the electronic component unit and carrier plate, one of the bezel and the case being mounted to the carrier plate.

22. A vehicle rearview mirror assembly comprising a carrier plate, an electronic component unit mounted on one face of the carrier plate, a mirror mounted on the other face of the carrier plate, a protective housing supported by the carrier plate, the housing exposing the mirror through a viewing aperture and enclosing the electronic component unit and carrier plate, and a support bracket assembly extending from the carrier plate through the housing, wherein the support bracket assembly is adapted to mount the mirror assembly to an interior surface of a vehicle and support the weight of the assembly via the carrier plate, wherein the electronic component unit includes a card reader having a card slot exposed by the housing, and wherein the electronic component unit includes electronic toll collection (ETC) circuitry connected to the card reader.

23. A rearview mirror assembly according to claim 22, further including a visual display for displaying electronic toll collection (ETC) information.

24. A vehicle rearview mirror assembly comprising a carrier plate, an electronic component unit mounted on one face of the carrier plate, a mirror mounted on the other face of the carrier plate, a protective housing supported by the carrier plate, the housing exposing the mirror through a viewing aperture and enclosing the electronic component unit and carrier plate, and a support bracket assembly extending from the carrier plate through the housing, wherein the support bracket assembly is adapted to mount the mirror assembly to an interior surface of a vehicle and support the weight of the assembly via the carrier plate, wherein the electronic component unit includes a card reader having a card slot exposed by the housing, and wherein the housing comprises a bezel surrounding the periphery of the mirror to define the viewing aperture and a case connected to the bezel and enclosing the electronic component unit and carrier plate, one of the bezel and the case being mounted to the carrier plate.

25. A vehicle rearview mirror assembly comprising a mirror, an electronic component unit, a protective housing exposing the mirror through a viewing aperture and enclosing the electronic component unit, an RF antenna connected to the electronic component unit, and a support bracket assembly adapted to mount the mirror assembly to an interior surface of a vehicle, the mirror assembly further including a visual display for displaying information provided by said electronic component unit, wherein the electronic component unit is mounted on one face of a carrier plate and the mirror is mounted on the other face of the carrier plate, the protective housing being supported by the carrier plate and the support bracket assembly extending through the housing from the carrier plate, whereby the support bracket assembly is adapted to support the weight of the assembly via the carrier plate.

26. A rearview mirror assembly according to claim 25, wherein the visual display is visible through an aperture in the front of the housing.

27. A rearview mirror assembly according to claim 26, wherein the electronic component unit is adapted to receive traffic information via the RF antenna and display such information on the visual display.

28. A rearview mirror assembly according to claim 27, wherein the electronic component unit is adapted to receive electronic toll collection (ETC) information via the RF antenna and display such information on the visual display.

* * * * *